United States Patent
Suzuki et al.

(10) Patent No.: US 6,822,364 B2
(45) Date of Patent: Nov. 23, 2004

(54) BRUSHLESS MOTOR

(75) Inventors: Hiroyuki Suzuki, Gamagori (JP);
Kazushi Sugishima, Hamamatsu (JP);
Yoshihito Nishikawa, Toyohashi (JP);
Mitsuhiko Matsushita, Shizuoka-ken (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 10/456,035

(22) Filed: Jun. 5, 2003

(65) Prior Publication Data

US 2004/0021393 A1 Feb. 5, 2004

(30) Foreign Application Priority Data

Jul. 30, 2002 (JP) ........................................ 2002-221618
Jul. 30, 2002 (JP) ........................................ 2002-221619

(51) Int. Cl.[7] .............................................. H02K 1/28
(52) U.S. Cl. ........................... 310/218; 310/89; 310/254
(58) Field of Search ............................ 310/89, 254, 218

(56) References Cited

U.S. PATENT DOCUMENTS

| 4,603,273 | A | * | 7/1986 | McDonald | 310/89 |
|---|---|---|---|---|---|
| 5,041,749 | A | * | 8/1991 | Gaser et al. | 310/156.22 |
| 5,283,486 | A | * | 2/1994 | Kobori | 310/49 R |
| 5,534,736 | A | * | 7/1996 | Johnson | 310/91 |
| 6,107,718 | A | * | 8/2000 | Schustek et al. | 310/218 |
| 6,140,728 | A | * | 10/2000 | Tomita et al. | 310/156.12 |
| 6,181,038 | B1 | * | 1/2001 | Van Rooij | 310/89 |
| 6,348,753 | B1 | * | 2/2002 | Sakai et al. | 310/254 |
| 6,472,780 | B2 | * | 10/2002 | Kikuchi et al. | 310/52 |
| 6,566,784 | B1 | * | 5/2003 | Hsu | 310/254 |
| 6,570,284 | B1 | * | 5/2003 | Agnes et al. | 310/89 |

FOREIGN PATENT DOCUMENTS

JP         09-019089        1/1997        ............ H02K/1/06

* cited by examiner

Primary Examiner—Dang Le
Assistant Examiner—Nguyen Hanh
(74) Attorney, Agent, or Firm—Sheridan Ross PC (57) ABSTRACT

A brushless motor includes a motor housing, a stator, a positioning projection, and a groove. The stator is fitted in the motor housing and includes an outer core and teeth, which extend in the radial direction of the stator. A radially outward end of each tooth is coupled with the outer core. Each tooth has a predetermined width in the circumferential direction of the stator. The positioning projection is located on the inner circumferential surface of the motor housing. The groove is located on the outer circumferential surface of the outer core. The groove is arranged on a radial line that passes through the center of the width direction of one of the teeth. The positioning projection is fitted in the groove to determine the position of the stator with respect to the motor housing in the circumferential direction.

11 Claims, 5 Drawing Sheets

BRUSHLESS MOTOR

BACKGROUND OF THE INVENTION

The present invention relates to an inner rotor type brushless motor.

For example, Japanese Patent No. 2875497 discloses an inner rotor type brushless motor that includes a stator core. The stator core is formed by laminating several core sheets. Each core sheet is formed by punching a magnetic metal plate. The stator core includes a ring-shaped outer core, a ring-shaped inner core, and teeth, which extend straight in the radial direction. A coil is wound about the teeth. The teeth are arranged along the circumferential direction of the stator core at equal angular intervals about the axis of the stator core. The radially inward end of each tooth extends from the inner core. The inner core has a rotor accommodating hole for accommodating a rotor. The radially outward end of each tooth is coupled with the inner circumferential portion of the outer core. In the case with the stator core of the publication, the coil can be wound about the teeth before coupling the outer core with the inner core.

A stator, which is formed by winding the coil to the above mentioned stator core, is inserted into a motor housing and fixed to the inner circumferential surface of the motor housing.

The above mentioned brushless motor has a rotational sensor, which detects the rotational position of the rotor. The rotational sensor is used to obtain a drive current suitable for generating a rotating magnetic field on the stator. The position of a rotating portion of the rotational sensor is determined with respect to the rotor in the circumferential direction of the stator such that the rotational sensor accurately detects the rotational position of the rotor. Further, the position of a fixed portion of the rotational sensor is determined with respect to the stator in the circumferential direction of the stator and then fixed to the motor housing.

Accordingly, a brushless motor that includes a positioning groove and a positioning projection has been proposed. The positioning groove is formed in the outer circumferential surface of the stator, that is, the outer circumferential surface of the outer core. The positioning groove is located at a substantial center between the adjacent teeth. The positioning groove extends in the axial direction of the stator. The positioning projection, which fits with the positioning groove, is formed in the inner circumferential surface of the motor housing. The circumferential width of the positioning groove and the circumferential width of the positioning projection are substantially the same, or the circumferential width of the positioning groove is slightly less than the circumferential width of the positioning projection so that the stator is firmly secured to the motor housing without any play in the circumferential direction.

When fitting the positioning projection to the positioning groove, a load is applied to the positioning groove of the outer core. The load is likely to cause distortion and deformation of the outer core.

The distortion and deformation of the outer core adversely affects the inner core and could reduce the circularity of the rotor accommodating hole. If the circularity of the rotor accommodating hole decreases, the size of the space between the stator and the rotor is changed. This decreases output of the motor, or increases vibration generated during rotation of the motor.

Each tooth extends straight in the radial direction. Each tooth and the outer core are coupled at a right angle. In other words, a joint portion between each tooth and the outer core is not smooth. Therefore, the magnetic path is bent at substantially the right angle at the joint portion between each tooth and the outer core, which increases the magnetic resistance. As a result, the performance of the motor is decreased.

SUMMARY OF THE INVENTION

Accordingly, it is an objective of the present invention to provide a brushless motor that is not likely to cause distortion and deformation of a stator and has an improved performance.

To achieve the above objective, the present invention provides a brushless motor, which includes a cylindrical motor housing, a stator, a fitting portion, and a fitted portion. The stator is fitted in the motor housing and includes a ring-shaped outer core and teeth, which extend in the radial direction of the stator. Each tooth has a radially outward end and a radially inward end. The radially outward end of each tooth is coupled with the outer core. Each tooth has a predetermined width in the circumferential direction of the stator. The fitting portion is located on the inner circumferential surface of the motor housing. The fitted portion is located on the outer circumferential surface of the outer core. The fitted portion is arranged on a radial line that passes through the center of the width direction of one of the teeth. The fitting portion is fitted to the fitted portion to determine the position of the stator with respect to the motor housing in the circumferential direction.

The present invention also provides a brushless motor. The brushless motor has a cylindrical motor housing, a stator, a plurality of coupling portions and a plurality of wide portions. The stator is secured to the inside of the motor housing. The stator includes a ring-shaped outer core, and a plurality of teeth, which are coupled with the outer core and extend in the radial direction of the stator. Each tooth has a radially outward end and a radially inward end. Each tooth has a predetermined width in the circumferential direction of the stator. The coupling portions, each of which corresponds to one of the teeth and is located between one of the corresponding tooth and the outer core. Each coupling portion couples the radially outward end of the corresponding tooth with the outer core. The circumferential width of each wide portion is greater than the width of a portion of each tooth other than where the corresponding coupling portion is formed.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be described with reference to FIGS. 1 to 5.

Figure 1:
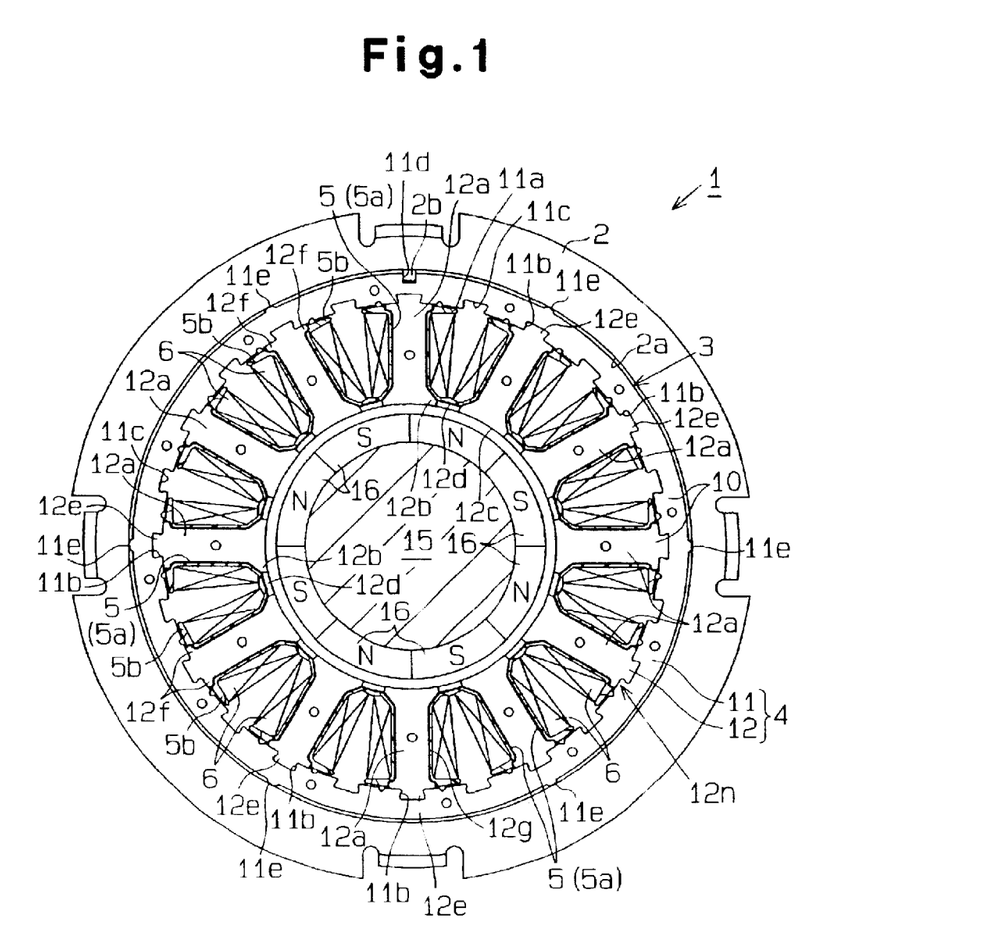
FIG. 1 is a cross-sectional view illustrating a rotary motor according to a preferred embodiment of the present invention.
Figure 4A:
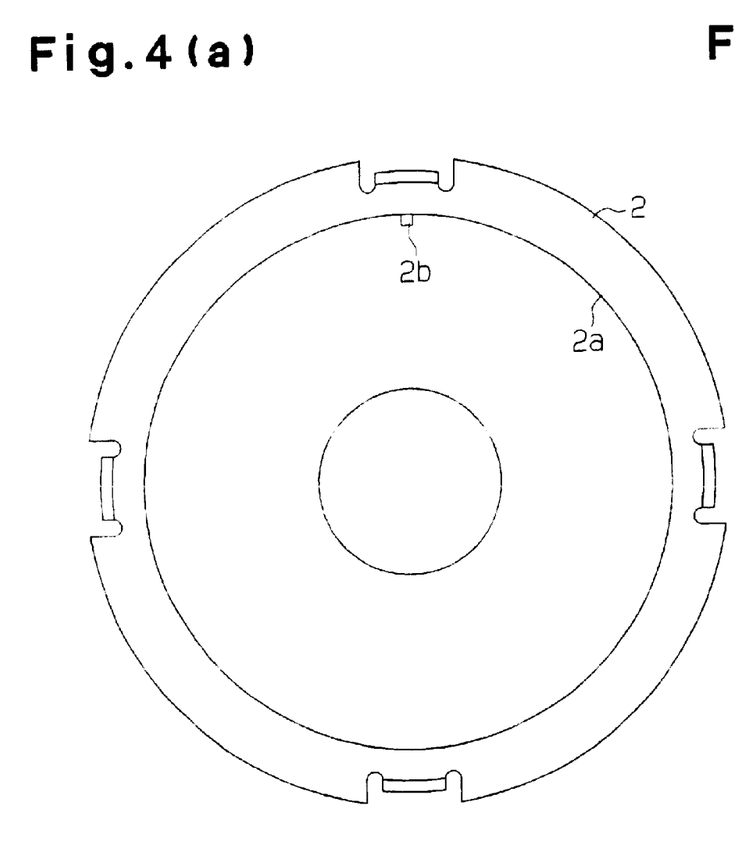
FIG. 4(a) is a cross-sectional view illustrating the motor housing of the rotary motor shown in FIG. 1.
Figure 4B:
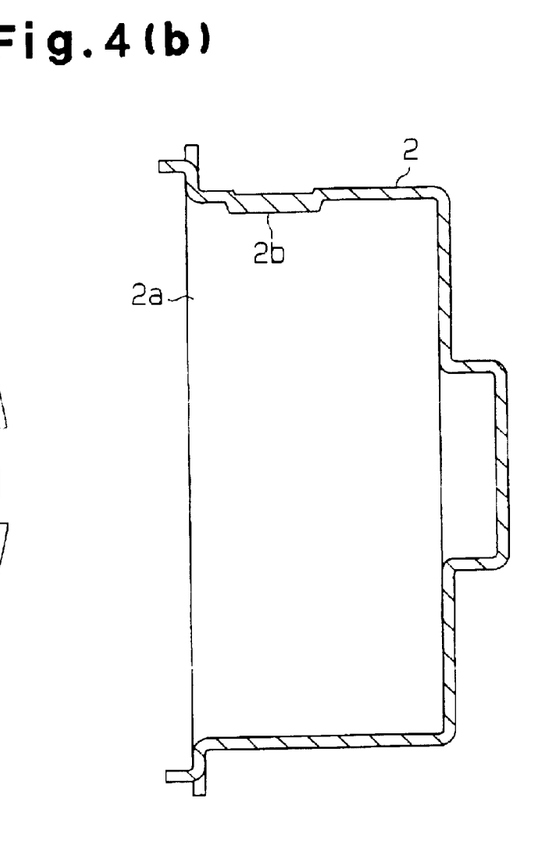
FIG. 4(b) is a plan view illustrating the motor housing of the rotary motor shown in FIG. 1.

FIG. 1 is a cross-sectional view of a brushless motor 1. The brushless motor 1 includes a reverse cup-shaped motor housing 2 as shown in FIGS. 4(a) and 4(b). The motor housing 2 has an inner circumferential surface 2a. A fitting portion, which is a positioning projection 2b in this embodiment, is formed on the inner circumferential surface 2a of the motor housing 2. The positioning projection 2b extends in the axial direction and has a rectangular cross-section. As shown in FIG. 1, a substantially annular stator 3 is secured to the inner circumferential surface 2a of the motor housing 2. The stator 3 includes a stator core 4, an insulator 5, and coils 6.

Figure 2:
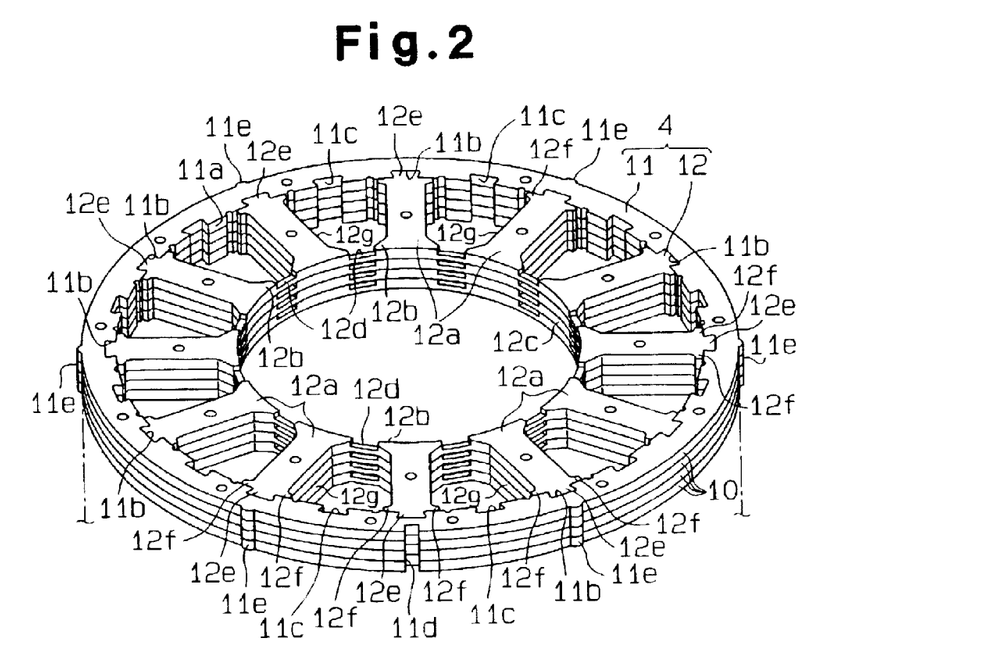
FIG. 2 is a perspective view illustrating the stator core of the rotary motor shown in FIG. 1.

As shown in FIG. 2, the stator core 4 is formed by laminating core sheets 10, which are made by punching magnetic metal plates. The stator core 4 includes an outer core 11 and an inner core 12.

Figure 3:
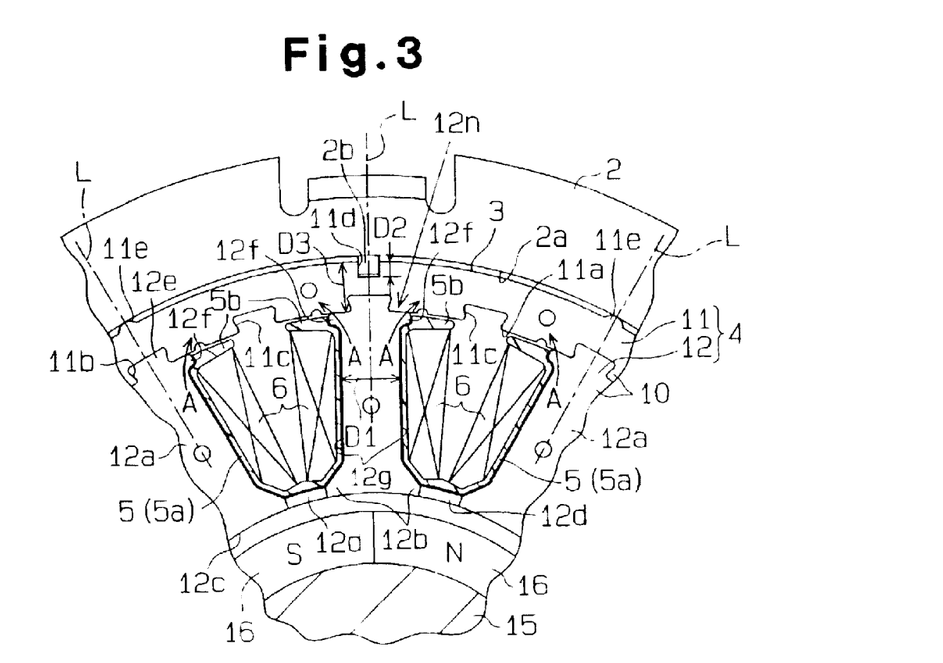
FIG. 3 is an enlarged partial cross-sectional view illustrating the stator of the rotary motor shown in FIG. 1.

The ring-shaped outer core 11 has twelve first recesses 11b. The first recesses 11b are formed on an inner circumferential portion 11a of the outer core 11 at equal angular intervals (30 degrees in this embodiment) about the axis of the outer core 11. Each first recess 11b is open radially inward. The distance between the opposing surfaces of each first recess 11b in the circumferential direction at the inner side of the radial direction is narrower than the distance between the opposing surfaces of the first recess 11b at the outer side of the radial direction. That is, each first recess 11b is substantially trapezoidal. The ring-shaped inner core 12 has twelve teeth 12a, which have substantially the same widths D1 and extend straight in the radial direction. Each coil 6 is wound about one of the teeth 12a. The teeth 12a are arranged at equal angular intervals (30 degrees in this embodiment) about the axis of the inner core 12. The circumferential width of each first recess 11b is slightly less than the circumferential width of each tooth 12a. A projection 12e is formed at the radially outward end of each tooth 12a as shown in FIGS. 2 and 3. Each projection 12e is fitted to one of the first recesses 11b of the outer core 11. Each projection 12e has a substantially trapezoidal shape that corresponds to the first recess 11b. That is, the distance between the opposing surfaces of the projection 12e in the circumferential direction at the inner side of the radial direction is narrower than the distance between the opposing surfaces of the projection 12e at the outer side of the radial direction. The inner core 12 has a ring-shaped coupler 12b, which couples the radially inward ends of the teeth 12a with one another. A rotor accommodating hole 12c is formed at the inner circumferential portion of the inner core 12 for accommodating the rotor 15. The coupler 12b has thin portions 12d. Each thin portion 12d is formed on a portion of each core sheet 10 that form the coupler 12b at the circumferential center between the adjacent teeth 12a. Each thin portion 12d increases the magnetic resistance to reduce leakage flux between the adjacent teeth 12a.

Second recesses 11c are formed on the outer core 11. Each second recess 11c is located between the adjacent first recesses 11b. The second recesses 11c are made when punching the inner core 12. That is, in the preferred embodiment, each core sheet 10 is made by punching a magnetic metal plate. When punching a magnetic metal plate, a portion (an inner core sheet portion) of each core sheet 10 that forms the inner core 12 is separated from a portion (an outer core sheet portion) of the core sheet 10 that forms the outer core 11 at the second recesses 11c. The outer core 11 is made by laminating several outer core sheets and the inner core sheet 12 is made by laminating several inner core sheets. When coupling the inner core 12 with the outer core 11, the inner core 12 is displaced by 15 degrees with respect to the outer core 11 from the punched position (where the second recesses 11c are formed) such that the projection 12e of each tooth 12a is coupled with one of the first recesses 11b. As described above, since the outer core sheet portion and the inner core sheet portion are formed by punching a magnetic metal plate at the same time, the difference between the distortion of the core sheet portions is decreased. This suppresses a misalignment between the outer core 11 and the inner core 12 when coupling the outer core 11 with the inner core 12. The coupling portion, which couples the radially outward end of each tooth 12a with the outer core forms a dovetail joint.

As shown in FIG. 3, a fitted portion, which is a positioning groove 11d in this embodiment, is formed on the outer circumferential surface of the outer core 11. The positioning groove 11d is located on a radial line L (hereinafter, referred to as a center line L), which passes through the center of the width D1 direction of one of the teeth 12a and extends in the axial direction of the outer core 11. The circumferential width of the positioning groove 11d is substantially the same as that of the positioning projection 2b. The width of the positioning groove 11d may be slightly less than the width of the positioning projection 2b. When the positioning projection 2b is fitted in the positioning groove 11d, the stator 3 is positioned with respect to the motor housing 2 without play in the circumferential direction. Therefore, a load is applied to the positioning groove 11d of the outer core 11 when fitting the positioning projection 2b to the positioning groove 11d. However, since the positioning projection 2b and the positioning groove 11d are located on the centerline L of the tooth 12a, the tooth 12a receives the load. Therefore distortion and deformation of the outer core 11 are not easily caused.

The radial dimension (depth) D2 of the positioning groove 11d is set to be less than or equal to a value obtained by subtracting half the width D1 of the tooth 12a from the radial dimension (width) D3 of a portion of the outer core 11 other than where the recesses 11b, 11c are formed. Since the positioning groove 11d is located on the centerline L of the tooth 12a, the magnetic flux that extends from the tooth 12a to the outer core 11 branches at the positioning groove 11d. On the contrary, the magnetic flux that extends from the outer core 11 to the tooth 12a flow into each other at the positioning groove 11d. When the depth D2 of the positioning groove 11d is set to be less than or equal to a value obtained by subtracting half the width D1 of the tooth 12a from the width D3, the width of the outer core 11 where the positioning groove 11d is formed (in this case, the positioning projection 12e of the tooth 12a is included as part of the outer core 11) is greater than or equal to half the width D1 of the tooth 12a. Accordingly, the flow of the magnetic flux that passes through the vicinity of the positioning groove 11d is not hindered. That is, the depth D2 of the positioning groove 11d is optimized and the magnetic resistance at the positioning groove 11d is prevented from increasing.

Six semicircular press-fit protrusions 11e are formed on the outer circumferential surface of the outer core 11. Two of the press-fit protrusions lie are located on both sides of the positioning groove 11d at portions shifted from the positioning groove 11d by 30 degrees in the circumferential direction. The remaining four press-fit protrusions lie are located every 60 degrees, or on the centerline L of every second tooth 12a. Each press-fit protrusion 11e projects radially outward. The radially outward lengths of the press-fit protrusions lie are set such that a predetermined pressure is generated between the press-fit protrusions lie and the inner circumferential surface 2a of the motor housing 2.

When the projections 12e of the teeth 12a are coupled with the first recesses 11b, a force is generated in a direction to pull the teeth 12a radially outward (or in a direction to cause the projections 12e to closely contact the outer core 11).

A wide portion 12n is formed at the radially outward end of each tooth 12a and arranged radially inward of the corresponding projection 12e. Each wide portion 12n includes a pair of extension pieces 12f. Each wide portion 12n expands in both circumferential directions. The wide portion 12n of each tooth 12a contacts the inner circumferential portion 11a of the outer core 11 to increase a contact portion between the corresponding tooth 12a and the outer core 11. The circumferential width of radially outward part of each wide portion 12n is greater than the width of radially inward part of the wide portion 12n. Therefore, the coupling portion between the radially outward end of each tooth 12a and the outer core 11 is formed as smooth as possible. Accordingly, as shown by an arrow A in FIG. 3, the curvature of the line of magnetic force at the wide portion 12n is gradual. That is, since the curvature of the magnetic path at the coupling portion is gradual, the magnetic resistance is reduced.

When the projections 12e of the teeth 12a are coupled with the first recesses 11b of the outer core 11, a force is generated to cause the teeth 12a to closely contact the outer core 11. Therefore, the teeth 12a are press-fit to the inner circumferential portion 11a of the outer core 11. Thus, no space is formed at the coupling portion between each tooth 12a and the outer core 11, which reduces the magnetic resistance. Although a force that pulls the tooth 12a radially outward is generated when each projection 12e is coupled with one of the first recesses 11b, the tensile strength is sufficiently received by the contact portion since the contact portion between each tooth 12a and the outer core 11 is increased by the corresponding wide portion 12n. This minimizes deformation of the rotor accommodating hole 12c located at the inner circumferential portion of the inner core 12, which prevents displacement of the center of the rotor accommodating hole 12c. In the preferred embodiment, the maximum width of the wide portion 12n of each tooth 12a is greater than the circumferential width D1 of each tooth 12a. The center angle is set to a value obtained by dividing 360 degrees by 2n (n is the number of the teeth 12a). That is, the center angle is set to a value within a predetermined dimensional range less than 15 degrees.

When the stator 3 is inserted into the motor housing 2, a load is applied to the positioning groove 11d of the outer core 11 and the press-fit protrusions 11e. In the preferred embodiment, the load is sufficiently received by the wide portion 12n of each tooth 12a. Thus, distortion and deformation of the outer core 11 are not easily caused.

The insulator 5 includes two parts, which are formed by resin molding and are attached to the inner core 12 from both axial ends. More specifically, each part includes an end surface coating portion (not shown), which insulates the axial ends of the teeth 12a on one side, and first coating portions 5a, each of which insulates the inner surface of one of the slots 12g formed between the adjacent teeth 12a. Two second coating portions 5b extend from the ends of each first coating portion 5a. The first coating portions 5a of each part are inserted into the slots 12g of the inner core 12 from one of the axial ends of the inner core 12. Since a very small space is formed between the first coating portions 5a and the inner surface of the slots 12g, the first coating portions Sa are easily inserted into the slots 12g. The insulator 5 insulates each coil 6, which is wound about one of the teeth 12a, from the corresponding tooth 12a.

The second coating portions 5b of each first coating portion 5a extend from the ends of the first coating portion 5a along the inner circumferential portion 11a. The second coating portions 5b cover the wide portions 12f of the teeth 12a and parts of the inner circumferential portion 11a of the outer core 11. The second coating portions 5b of each tooth 12a insulate the corresponding coil 6 from the inner circumferential portion 11a of the outer core 11. The second coating portions 5b or each tooth 12a are supported by the corresponding wide portion 12n. For example, even if a force is applied to each second coating portion 5b in a direction to bend the second coating portion 5b radially outward when winding the corresponding coil 6, the second coating portion 5b is supported by the wide portion 12n of the corresponding tooth 12a. Therefore, each second coating portion 5b is prevented from being cracked.

Figure 5:
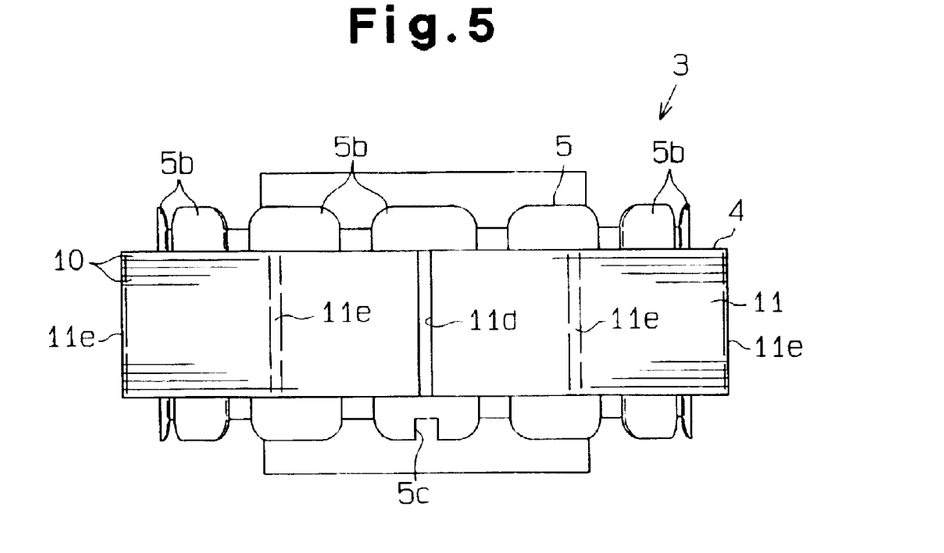
FIG. 5 is a side view illustrating the stator of the rotary motor shown in FIG. 1.

As shown in FIG. 5, each second coating portion 5b extends in the axial direction by a predetermined distance from the axial ends of the stator core 4. A notch 5c is formed on one of the projected portions of the second coating portions 5b that corresponds to the positioning groove 11d. The notch 5c is located at a portion where it is easily seen from one axial end (from the lower side in FIG. 5) even after the coils 6 are wound. The notch 5c serves as a reference when winding the coils 6 to the inner core 12 to which the insulator 5 is attached. When attaching the inner core 12 to the outer core 11, the notch 5c is arranged to align with the positioning groove 11d of the outer core 11. The notch 5c facilitates aligning the positioning groove 11 with the positioning projection 2b when inserting the assembled stator 3 to the motor housing 2.

The stator 3 of the preferred embodiment is manufactured in the following manner. At first, a portion of each core sheet 10 that forms the inner core 12 is separated from a portion of the core sheet 10 that forms the outer core 11 at the second recesses 11c. Then, the insulator 5 is attached to the inner core 12. The coils 6 are wound about the teeth 12a of the inner core 12 using the notch 5c formed on the insulator 5 as a reference. The outer core 11 is coupled with the inner core 12, to which the coils 6 are wound, such that the notch 5c of the insulator 5 is aligned with the positioning groove 11d of the outer core 11 in the axial direction. This completes the stator 3. The positioning projection 2b of the motor housing 2 is aligned with the positioning groove 11d of the outer core 11 with reference to the notch 5c of the insulator 5. The stator 3 is inserted in the housing 2 such that the positioning projection 2b is fitted to the positioning groove 11d. Fitting the positioning projection 2b to the positioning groove 11d determines the position of the stator 3 with respect to the motor housing 2 without any play in the circumferential direction. The stator 3 is press-fitted to the inner circumferential surface 2a of the motor housing 2 by the press-fit protrusions 11e. Therefore, a play is further prevented from being caused in the circumferential direction with respect to the motor housing 2.

As shown in FIG. 1, the rotor 15 is rotatably accommodated in the rotor accommodating hole 12c of the stator 3, which is secured to the motor housing 2. Eight magnets 16 are secured to the outer circumferential surface of the rotor 15 such that the north pole and the south pole are arranged alternately. When a drive current is supplied to the coil 6 of the stator 3, a rotating magnetic field is generated on the stator 3, which rotates the rotor 15.

The preferred embodiment provides the following advantages.

When determining the position of the stator 3 with respect to the motor housing 2 in the circumferential direction, the positioning projection 2b needs to be fitted to the positioning groove 11d without a play or with a minimum play. When fitting the positioning projection 2b to the positioning groove 11d, a load is applied to the positioning groove 11d. In the preferred embodiment, the positioning projection 2b and the positioning groove 11d are located on the radial line L (centerline L), which passes through the center of the width D1 direction of one of the teeth 12a. Therefore, the tooth 12a receives the load, and thus distortion and deformation of the outer core 11 are not easily caused. Accordingly, the circularity of the rotor accommodating hole 12c, which is located at the inner circumferential portion of the inner core 12, is maintained high. This reduces variation of the space between the stator 3 and the rotor 15. As a result, in the preferred embodiment, the decrease of the output of the motor I and the increase of the vibration caused during rotation of the motor 1 are prevented.

The fitting portion is formed by one positioning projection 2b and one positioning groove 11d. Therefore, the fitting portion is easily formed.

The depth D2 of the positioning groove 11d is set to be less than or equal to a value obtained by subtracting half the width D1 of each tooth 12a from the width D3 of the outer core 11. Since the positioning groove 11d is located on the centerline L of the tooth 12a, the magnetic flux that flows from the tooth 12a to the outer core 11 branches at the positioning groove 11d. On the contrary, the magnetic flux that extends from the outer core 11 to the tooth 12a flow into each other at the positioning groove 11d. When the depth D2 of the positioning groove 11d is set to be less than or equal to a value obtained by subtracting half the width D1 of each tooth 12a from the width D3 of the outer core 11, the width of the outer core 11 where the positioning groove 11d is formed is sufficient. Accordingly, the flow of the magnetic flux that passes through the vicinity of the positioning groove 11d is not hindered. That is, the depth D2 of the positioning groove 11d is optimized and the magnetic resistance at the positioning groove 11d is prevented from increasing.

The press-fit protrusions lie are formed on the outer circumferential surface of the outer core 11 to press-fit the stator 3 to the inner circumferential surface 2a of the motor housing 2. Each press-fit protrusion lie is located on the centerline L of the corresponding tooth 12a. This firmly secures the stator 3 to the motor housing 2 and further prevents a play to be caused in the circumferential direction.

Each press-fit protrusion 11e is located on the centerline L of the corresponding tooth 12a. Therefore, even if a press-fit load is applied to each press-fit protrusion lie of the outer core 11, the corresponding tooth 12a receives the load. Thus, distortion and deformation are not easily caused on the outer core 11. Since the press-fit protrusions 11e are arranged at equal intervals in the circumferential direction, distortion and deformation are not easily caused on the outer core 11, and the stator 3 is stably secured to the motor housing 2.

The curvature of the magnetic path at the coupling portion between each tooth 12a of the inner core 12 and the outer core 11 becomes gradual by forming the wide portion 12n on each tooth 12a. This reduces the magnetic resistance. Therefore, the characteristic of the stator 3 is improved, which improves the performance of the brushless motor 1 that uses the stator 3. The width of the radially outside portion of each wide portion 12n is greater than the width of the radially inward portion of the wide portion 12n. This further reduces the magnetic resistance.

The coupling portion is designed such that a force that causes a first member, which is the teeth 12a having the wide portions 12f, to closely contact a second member, which is the outer core 11, when the first recesses 11b of the outer core 11 are coupled with the projections 12e of the teeth 12a. Therefore, a space is not formed between each tooth 12a and the outer core 11. This further reduces the magnetic resistance at the coupling portions.

Each core sheet 10, which includes the outer core sheet and the inner core sheet, is formed by punching a magnetic metal plate at the same time. Therefore, the difference between the distortion of the outer core 11 and that of the inner core 12 is reduced. This suppresses the misalignment of the center of the outer core 11 and the center of the inner core 12 when coupling the outer core 11 with the inner core 12. Also, the magnetic metal plate for forming the outer core 11 and the inner core 12 is reduced.

Since the second coating portions 5b of the insulator 5 are supported by the wide portions 12f, the second coating portions 5b are prevented from being cracked when a force is applied in a direction to bend the second coating portions 5b radially outward by winding the coils 6.

It should be apparent to those skilled in the art that the present invention may be embodied in many other specific forms without departing from the spirit or scope of the invention. Particularly, it should be understood that the invention may be embodied in the following forms.

In the embodiments of FIGS. 1 to 5, the location of the positioning projection 2b and the positioning groove 11d are not limited. That is, the positioning projection 2b may be located on the stator 3 and the positioning groove 11d may be located on the motor housing 2. The number of the positioning projection 2b and the positioning groove 11d need not be one each but may be more than one.

Figure 6:
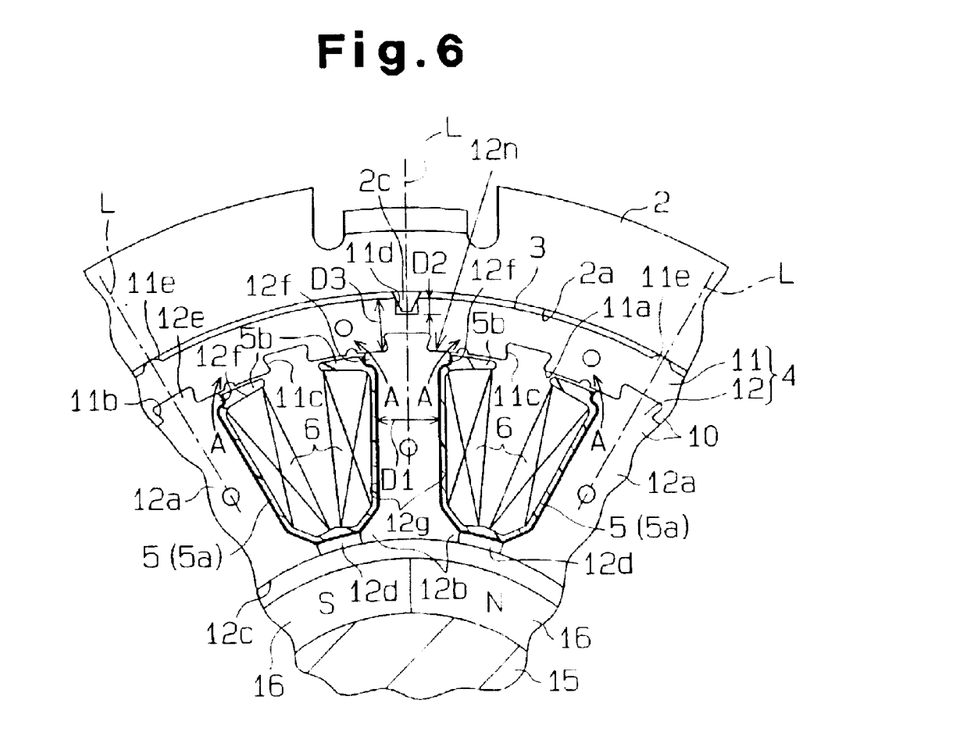
FIG. 6 is an enlarged partial cross-sectional view illustrating a stator according to a modified embodiment.

The shape of the positioning projection 2b and the positioning groove 11d need not be rectangular but may be changed as required. For example, as shown in FIG. 6, a positioning projection 2c may have a trapezoidal cross-section. In this case, the positioning projection 2c and the positioning groove 11d are in a line contact. Therefore, the frictional resistance between the positioning projection 2c and the positioning groove 11d is reduced. This facilitates the stator 3 to be inserted into the motor housing 2. The load applied to the stator 3 when inserting the stator 3 to the motor housing 2 is also reduced. Therefore, distortion and deformation of the outer core 11 and the inner core 12 are not easily caused. Further, since the load is applied in the circumferential direction, distortion and deformation of the outer core 11 and the inner core 12 are not easily caused. Therefore, the circularity of the rotor accommodating hole 12c of the inner core 12 is maintained high. When the positioning groove 11d is formed to have a trapezoidal shape, the same advantages are provided. Further, the projection and groove may be in point contact. In other words, the shape of the projection may form part of a sphere.

Figure 7:
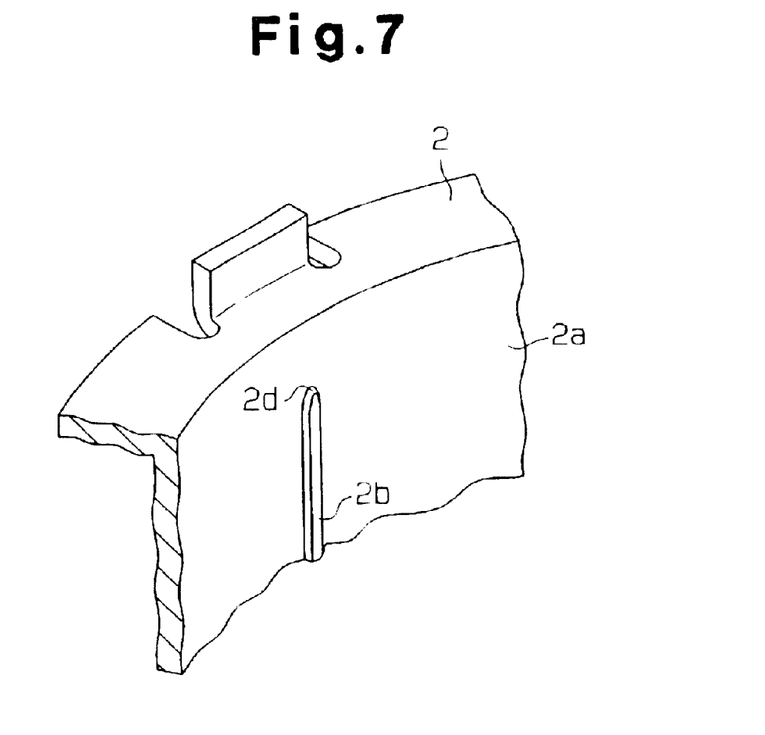
FIG. 7 is a partial perspective view illustrating a housing showing a positioning projection according to another modified embodiment.

The shape of the positioning projection 2b may differ from the shapes of the embodiments of FIGS. 1 to 6. For example, as shown in FIG. 7, one end portion 2d of the positioning projection 2b that is on the opening side of the motor housing 2 is tapered such that the width of the positioning projection 2b gradually decreases toward the distal end. In this case, even if the positioning projection 2b is slightly displaced in the circumferential direction with respect to the positioning groove 11d, the stator 3 is arranged at an appropriate position by sliding along the end portion 2d of the positioning projection 2b. Also, the positioning projection 2b is easily inserted into the positioning groove 11d, which facilitates inserting the stator 3 to the motor housing 2.

Figure 8:
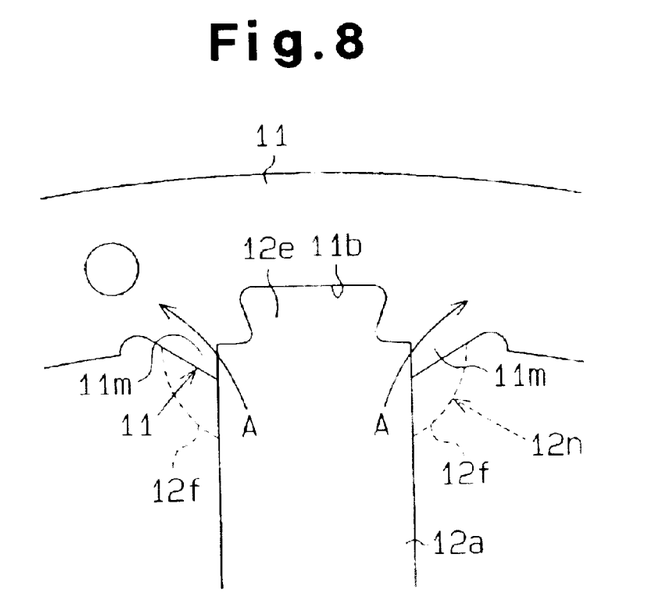
FIG. 8 is an enlarged partial perspective view illustrating a coupling portion between the radially outward end of a tooth and an outer core according to another modified embodiment.

The wide portion 12n shown in FIGS. 1 to 5 may be located on the outer core 11 instead of the teeth 12a. For example, as shown in FIG. 8, pairs of inclined pieces 11m may be formed integrally with the outer core 11. In this case, each pair of the inclined pieces 11m is located at portions corresponding to one of pairs of extension pieces 12f, which are included in one of the wide portions 12n of FIGS. 1 to 5. Each pair of the inclined pieces 11m sandwich one of the teeth 12a and function as a wide portion 11n similar to the wide portion 12n of FIGS. 1 to 5. The circumferential width of the wide portion 11n at the radially outward portion of the corresponding tooth 12a is greater than the circumferential width of the inclined piece 11m at the radially inward portion of the tooth 12a. Each inclined piece 11m and the tooth 12a are coupled to each other such that an angle defined by the inclined piece 11m and the end surface of the tooth 12a, which extends in the axial direction in FIG. 8, is an obtuse angle. In this modified embodiment also, the curvature of the line of magnetic force at the coupling portion between each tooth 12a and the outer core 11 is gradual as shown by arrows A. Therefore, the curvature of the magnetic path at the coupling portion is gradual. Thus, the modified embodiment provides the same advantages as the preferred embodiment shown in FIGS. 1 to 5. In the modified embodiment of FIG. 8, each tooth 12a may further be provided with the wide portion 12n.

In the preferred embodiment of FIGS. 1 to 5, the number, shape, and position of the projections 11e may be changed as required.

The press-fit protrusions lie may be omitted from the stator 3. In this case, the stator 3 is secured to the motor housing 2 using other fixing member.

The structure of the brushless motor 1 may be changed to a structure not mentioned above. For example, the teeth 12a are arranged on the inner core 12 at equal intervals in the preferred embodiment. However, the teeth 12a need not be arranged at equal intervals. The number of the teeth 12a may be other than twelve. The projections 12e are formed on the inner core 12 and the first recesses 11b are formed on the outer core 11 in the preferred embodiment. However, the projections 12e may be formed on the outer core 11 and the first recesses 11b may be formed on the inner core 12. When the projections 12e are coupled with the first recesses 11b, a force that causes the teeth 12a to closely contact the outer core 11 need not be generated.

In the embodiments of FIGS. 1 to 8, the outer core 11 and the inner core 12 are formed by punching a magnetic metal plate at the same time. However, the outer core 11 and the inner core 12 need not be formed by punching a magnetic metal plate at the same time. The outer core 11 and the inner core 12 may be separately formed by punching different portions of a magnetic metal plate, or the outer core 11 and the inner core 12 may be formed by punching different magnetic metal plates.

The embodiments of FIGS. 1 to 8 may be embodied in a rotary motor other than a brushless motor, such as a stator of an induction motor.

The present examples and embodiments are to be considered as illustrative and not restrictive and the invention is not to be limited to the details given herein, but may be modified within the scope and equivalence of the appended claims.

What is claimed is:

1. A brushless motor comprising:
a cylindrical motor housing;
a stator fitted in the motor housing, wherein the stator includes:
a ring-shaped outer core having a plurality of protrusions formed on the outer circumferential surface of the outer core, and, when the stator is inserted in the motor housing, each protrusion is press-fit to the inner circumferential surface of the motor housing;
a plurality of teeth, which extend in the radial direction of the stator, wherein each tooth has a radially outward end and a radially inward end, wherein the radially outward end of each tooth is coupled with the outer core, and wherein each tooth has a predetermined width in the circumferential direction of the stator, wherein each protrusion is arranged on a radial line that corresponds to one of the teeth in the circumferential direction of the stator, with each protrusion located on the center of the width direction of the corresponding tooth; and
a ring-shaped coupler, which couples the radially inward ends of the teeth;
a fitting portion located on the inner circumferential surface of the motor housing; and
a fitted portion located on the outer circumferential surface of the outer corre, wherein the fitted portion is arranged on a radial line that passes through the center of the width portion of one of the teeth, and wherein the fitting portion is fitted to the fitted portion to determine the position of the stator with respect to the motor housing in the circumferential direction.

2. The brushless motor according to claim 1, wherein the fitting portion is a positioning projection, which extends along the axial direction of the motor housing, and wherein the fitted portion is a groove, which extends along the axial direction of the outer core.

3. The brushless motor according to claim 2, wherein the depth of the groove in the radial direction of the motor housing is less than or equal to a value obtained by subtracting half the width of each tooth from the width of the outer core.

4. The brushless motor according to claim 2, wherein one end of the positioning projection in the axial direction of the motor is tapered.

5. The brushless motor according to claim 1, wherein the fitting portion and the fitted portion are in a point contact or in a line contact with each other in the circumferential direction.

6. The brushless motor according to claim 1, wherein the protrusions are formed at equal angular intervals in the circumferential direction of the stator.

7. The brushless motor according to claim 1, wherein a coupling portion is formed between the radially outward end of each tooth and the outer core, wherein each coupling portion couples the radially outward end of the corresponding tooth with the outer core, wherein each coupling portion includes a wide portion, and wherein the circumferential width of each wide portion is greater than the width of a portion of each tooth other than where the coupling portion is formed.

8. The brushless motor according to claim 7, wherein one of the set of the teeth and the outer core is a first member, which as the wide portions, wherein the other one of the set of the teeth and the outer core is a second member, which contacts the wide portions, and wherein the coupling portion is designed such that a force that causes the wide portions to closely contact the second member is generated when the teeth are coupled with the outer core.

9. The brushless motor according to claim 8, wherein each coupling portion includes a dovetail joint.

10. The brushless motor according to claim 8, wherein each coupling portion includes a projection and a recess, wherein the projection is formed on one of the corresponding tooth and the outer core, and the recess is formed on the other one of the corresponding tooth and the outer core to be fitted to the projection, and wherein the projection and the recess have trapezoidal shapes such that the circumferential width of the coupling portion gradually decreases toward the radially inner portion of the stator.

11. The brushless motor according to claim 7, further comprising a insulator for coating the teeth, wherein the insulator coats the wide portions and portions supported by the wide portions.

* * * * *